United States Patent
Scafidi et al.

(10) Patent No.: US 7,195,490 B1
(45) Date of Patent: Mar. 27, 2007

(54) BEHAVIOR MODIFICATION SYSTEM

(76) Inventors: Salvatore Scafidi, 4026 Maiden St., Waterford, MI (US) 48329; Lauren A. Scafidi, 4026 Maiden St., Waterford, MI (US) 48329

( * ) Notice: Subject to any disclaimer, the term of this patent is extended or adjusted under 35 U.S.C. 154(b) by 696 days.

(21) Appl. No.: 10/134,999

(22) Filed: Apr. 30, 2002

(51) Int. Cl.
*G09B 19/00* (2006.01)

(52) U.S. Cl. ...................................................... 434/236

(58) Field of Classification Search ............... 434/236, 434/237, 238, 112, 322, 365; 283/46; 462/17; 281/2, 5, 44, 15.1; 40/584, 586, 596; 116/1, 116/18, 200, 201, 205; 446/26, 220, 221, 446/223, 369
See application file for complete search history.

(56) References Cited

U.S. PATENT DOCUMENTS

| | | | | |
|---|---|---|---|---|
| D65,507 S | * | 8/1924 | Tracy ............................... D3/7 |
| 2,997,217 A | * | 8/1961 | Levy ............................. 223/92 |
| 4,091,976 A | * | 5/1978 | Morse .......................... 294/142 |
| 4,345,777 A | * | 8/1982 | Perego ......................... 280/647 |
| 4,795,348 A | * | 1/1989 | Garthwaite ................... 434/112 |
| 4,796,648 A | * | 1/1989 | Goulter ......................... 135/65 |
| 4,971,210 A | * | 11/1990 | Blumenkranz et al. ..... 211/123 |
| 5,040,988 A | * | 8/1991 | Brown ......................... 434/236 |
| 5,580,254 A | * | 12/1996 | Ramsey ....................... 434/236 |
| 5,741,137 A | * | 4/1998 | Aduvala ....................... 434/236 |
| 5,775,554 A | * | 7/1998 | Taylor ........................... 223/96 |
| 5,910,009 A | * | 6/1999 | Leff et al. .................... 434/322 |
| 6,056,549 A | * | 5/2000 | Fletcher ....................... 434/112 |
| 6,618,947 B1 | * | 9/2003 | Gardiner et al. .............. 30/161 |

OTHER PUBLICATIONS

Icon Promotional Products, "Stress Toy, Question Mark" [online] Mar. 22, 2002.*
"Rapid Phone", Digital Integration (NZ) Ltd. [online], 1998.*
"Trend-Green 5" Casual Ready Letters", Mar. 24, 2002 [retrieved online Aug. 1, 2006].*
"Eurps: About Eurps", Sep. 2000 [retrieved online Jul. 28, 2006].*

* cited by examiner

*Primary Examiner*—Kurt Fernstrom

(57) ABSTRACT

A tool for and a method of communication that teaches children how to ask a person a question when the person is busy. Children learn to use any one of three tools that enable them to silently communicate a question without interrupting the person. The tools consist of a specialized sheet of paper, a plush toy sculpted into the shape of a question mark, and a dry eraser board. By handing one of the three objects to the person that is busy, the child is saying, without uttering a single word, "I have a question. I know you are busy right now. My question is really important. As soon as you are through doing what you are doing, I need to talk to you." The person being questioned knows there is a question to answer as soon as he/she is able to do so. The child knows that the question has been acknowledged, a waiting period is involved, and that an answer will be forthcoming.

2 Claims, 2 Drawing Sheets

BEHAVIOR MODIFICATION SYSTEM

FIELD OF THE INVENTION

This invention relates to the field of communication and more particularly concerns a advice for and a method of providing silent communication between a person that does not wish to be disturbed and by a child that has a question needing an answer.

BACKGROUND OF INVENTION

Children have a tendency to verbally interrupt adults when they are busy. If ever a person has been interrupted by a child during an important phone conversation, he/she knows just what I mean. People I have interviewed on the subject tell me what a difficult problem it is to deal with. Most parents just tell their children not to interrupt when they are on the phone or talking with someone else. Even though we tell the child that it is not polite to interrupt, for some reason that message never seems to be enough. It usually leads to some form of disciplinary action without curing the problem, which still reoccurs over and over again. Children feel bad after being reprimanded and sad because somehow their question became irrelevant. This type of behavior can be exasperating for parents and embarrassing sometimes. Parents are left wondering, "How can this be happening to me again?" Behavioral psychologists agree that punishing troubling behavior lowers self esteem and causes emotional distress. Punishment may temporarily suppress inappropriate behavior, but does very little to effect long-term change. Rather than taking disciplinary action to the next level, it is suggested that the communication system according to the present invention be used. One parent I interviewed said she doesn't allow her child to interrupt her. When asked, "What do you do when your now 10 year old daughter interrupts you when you're on the phone?" She replied, "I turn and run into the bathroom and shut the door." Obviously that technique minimizes the damage to the current telephone caller but she definitely still has the problem. She's also totally in denial. In other words, the problem exists and is more prevalent than some parents want to admit. I believe that one of the reasons for the existence of this problem is that the brain cannot interpret verbal information from multiple sources simultaneously. When two people talk to you at the same time, sensory overload occurs instantly, because both verbal stimuli are competing for the same cranial nerve pathway into the brain.

Beginning in pre-school, children around the globe learn the universal sign of raising their hand for "I have a question.". This silent method of communication has been around a very long time. Besides being easy, the reason it works so well is because verbal and visual input take separate pathways into the brain. Both stimuli easily slip into the brain and are processed instantly and simultaneously. When a speaker or a listener sees a hand go up, communication doesn't abruptly end. It actually continues and expands to include others. No valuable information is lost, because no communication breakdown occurs. This sign language technique is perfect for the classroom and other institutional settings. However, it doesn't appear to be the method of choice at home and in other social situations. In fact, outside the classroom, there is no specific protocol or universal method for silently interrupting someone, until now. My invention provides a specific home remedy, which has been proven to correct this behavior in a manner that is satisfactory to both the child and the adult.

SUMMARY OF THE INVENTION

More specifically my invention is a non-verbal form of communication utilizing sign language, symbols and the written word. Children using these tools will witness the power of their silence. This method keeps communication channels open and uniquely provides one with the ability to pause communications, instead of shutting it down or cutting it off entirely. Children will enjoy this method of communicating. In their eyes, any communication is better than being cut off entirely. Generally speaking, the better trained a child is, the less discipline they require. The better the tools, the easier they are to train. In this case, anyone of three tools can be used for providing silent communication in accordance with the present invention.

In the preferred form, the first tool used to practice the invention is a sculpted physical embodiment of a question-mark in the form of a plush toy that can be hung on the wrist of the adult by the child when the child has a question. The second tool is a specialized sheet of paper having a question mark on the back, along with the sign-language-sign for silence. Children are instructed to use the paper just like the plush toy. The third tool for silent communication is a dry erase marker board. It looks like and functions exactly like the front side of the paper form and comes with it's own marker and wipes clean with a tissue.

Note that the age of the child will determine which of the tools is to be used for communication. If the child is at a tender age and not able to read, the adult would explain to the child that if there is a question when the adult is busy, the plush toy should be hung on his/her arm and that the child should wait until he/she is no longer busy for an answer. In the case of an older child having the ability to read, either the specialized sheet or the dry erase marker board can be utilized for communication between the child and the adult in a manner as will be more fully explained hereinafter.

Accordingly, one object of the present invention is to provide a new and improved method of communicating silently between two persons while one of the persons is busy and the other person needs an answer to a question.

Another object of the present invention is to provide a new and improved method of silent communication between two persons wherein a tool is placed on a body part of one of the persons for indicating to the other person that a question needs an answer.

A further object of the present invention is to provide a new and improved method of communicating silently between two persons wherein the person having a question places a tool in the form of a "question mark" on a body part of the other person to signal that he/she has a question needing an answer.

A still further object of the present invention is to provide a new and improved tool for providing silent communication between a first person who needs an answer to a question and a second person who is busy and does not wish to be disturbed wherein the tool has indicia thereon that visually indicates to the second person that the first person has a question that needs an answer A still further object of the present invention is to provide a new and improved tool for providing silent communication between a busy first person and a second person having a question wherein the tool is an eraser board with indicia thereon that is shown by the second person to the first person and provides the first person with the ability to acknowledge to the second person that an answer will be provided to the first person when the second person is no longer busy.

BRIEF DESCRIPTION OF THE DRAWINGS

The present invention can be achieved in accordance with one or more of the above objects. Other objects and advantages of the present invention will be apparent from the following detailed description when taken with the drawings in which.

DETAILED DESCRIPTION OF THE INVENTION

Figure 1:
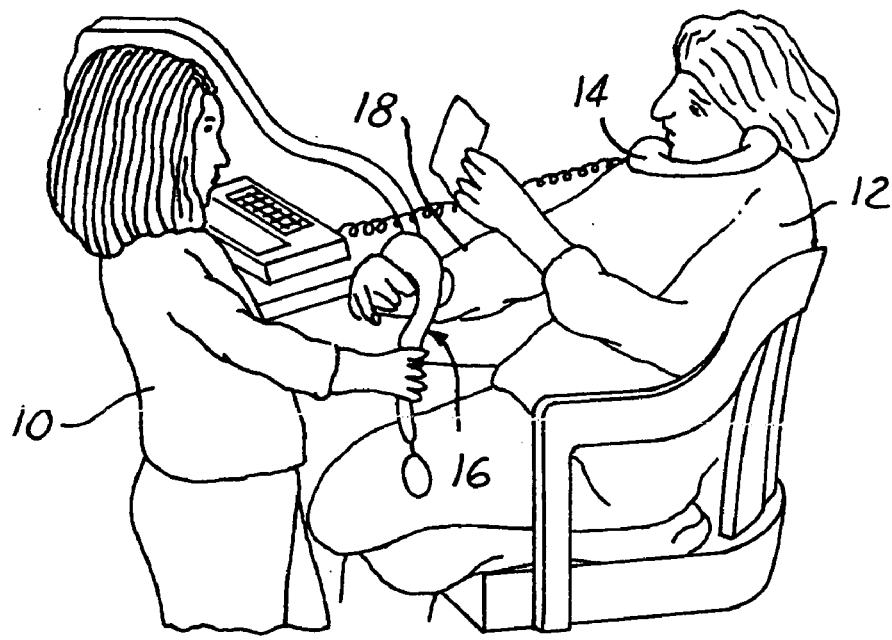
FIG. 1 is a view of a child having a question placing a tool in the form of a question-mark on the wrist of a person that is busy during a conversation on a telephone.
Figure 2:
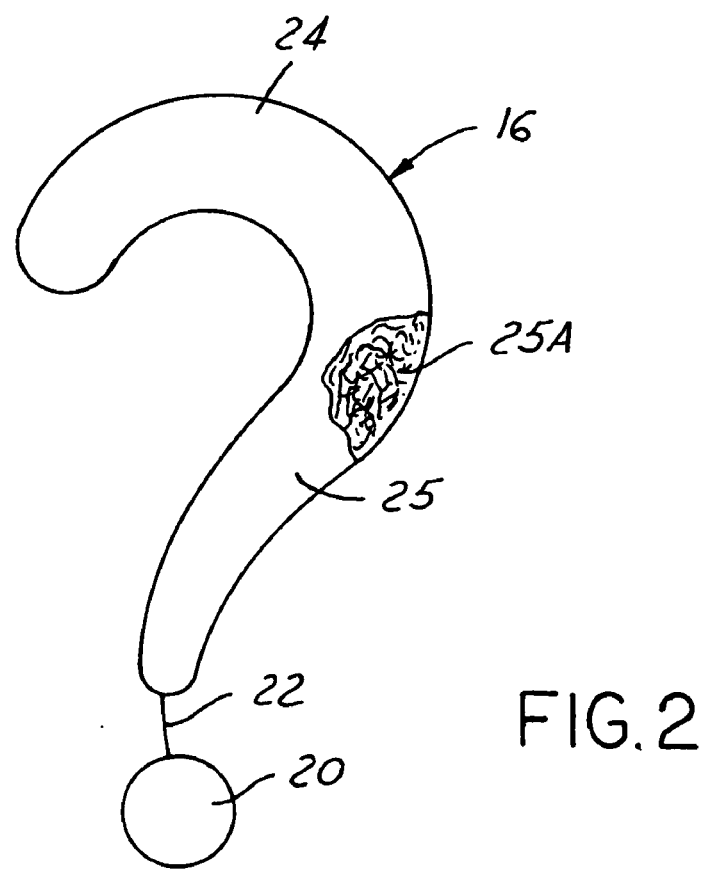
FIG. 2 is an enlarged view of the tool seen in FIG. 1.

Referring to the drawings and more particularly FIGS. 1 and 2 thereof, a female child 10 (first person) is shown standing close to her mother 12 (second person) who is sitting at a desk and is busy holding a telephone receiver 14 and talking to third person. While the mother 12 is busy, the child 10 is placing a tool 16 in the form of a plush toy question-mark onto the wrist 18 of the mother 12. This simple act demonstrates to the mother 12 who is busy speaking and listening on the telephone, "Mom, I have a question and I know you're busy right now. I won't say a word, but as soon as you're finished, I need to talk to you about something.". The mother 12, as soon as she is finished with the present telephone call, will then seek out the child 10 and answer the question before going on to something else. It's important to note here that the child 10 may wait patiently and quietly in the room for a response, or may go do something else. The child 10 knows that the silent message has been conveyed to her mother 12 and that it is the obligation of the mother 12 to follow up on the question that needs an answer.

The tool 16 does not necessarily have to be hung on the arm of the person to indicate that a question needs an answer although this would be the preferred method of communicating that fact. For example, another method would be to hand the tool 16 to the person or simply bring it into their field of vision. This device and method is perfect for training young children who do not as yet know how to read and write, how to ask a question of someone who is busy without rudely interrupting.

As mentioned above and as best seen in FIG. 2, the tool 16 takes the form of a plush toy question-mark having a vertical dimension of 14 inches, a width of 7 inches at its widest point, and is 2 inches in diameter with a 2 inch diameter ball 20 attached to the main body of the question mark by a 1 inch string 22. The inside dimension of the curved hook portion 24 will be about 3 inches across so as to fit around an average size wrist. The cover material is made of a plush fabric while the interior is stuffed with a polyester fiberfill material 25A.

It should be apparent that the question-mark tool 16 need not be limited to being a plush stuffed-toy-like article and made of the materials mentioned above. In other words, the tool 16 can have other forms such as being an inflatable plastic question-mark device and could be used in exactly the same manner as the plush toy tool 16. Also a soft foam or solid rubber version of the tool 16 could be used in place of the plush toy question mark. Even a flat rigid cardboard model of similar size and in the shape of a question-mark would serve the same purpose as the plush toy. Regardless of the material used to manufacture the question-mark device, the message remains exactly the same. "I have a question and realize you are busy at the moment. As soon as you are free I need to talk to you."

Figure 3:
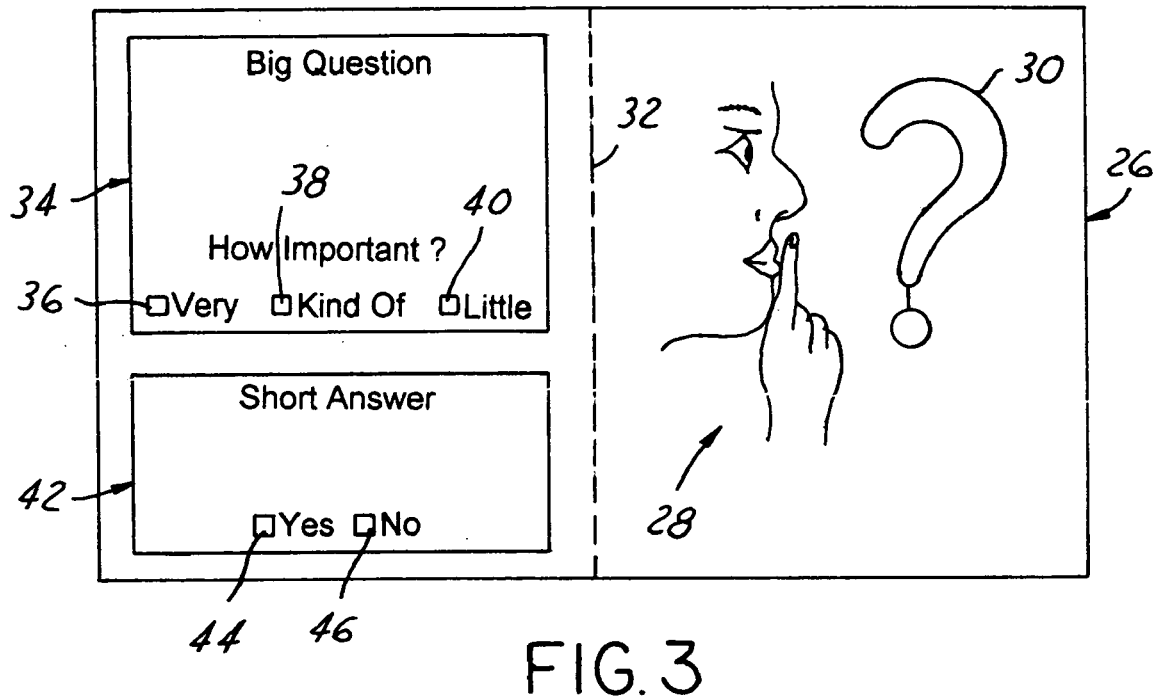
FIG. 3 is view of a second type of silent communication tool that takes the form of a specialized sheet that is foldable so as to present a sign-language-sign for silence on one side of the sheet and question and answer boxes on the other side of the sheet.

Another tool that can be used to silently communicate a question is the specialized sheet of paper in FIG. 3 that is generally indicated by reference numeral 26. The tool 26 is in the form of a folded 8½×11 inch sheet of paper and is best used by those that know how to read and write. However, children that are unable to do so can still present this tool 26 to a person who is busy in order to indicate they have a question.

More specifically and as seen in FIG. 3, one side of the tool 26 has the sign-language-sign 28 for silence accompanied by a question-mark 30. The sign-language-sign 28 consists of a facial view of a person with his/her index finger adjacent to his/her lips. These two symbols are important for practicing this entire methodology in that they visually permit a person to ask a question silently, without rudely interrupting someone who is busy. The other side of the tool 26, when folded along the dash lines 32, has a "Big Question" section 34. The person with the question will use this side of the specialized sheet to write down their question. The person with the question may also wish to indicate how important their question is by checking one of three boxes 36, 48, or 40 adjacent the words "VERY", "KIND OF", and "LITTLE", respectively. The person who receives this specialized tool 26 from the person who has a question may choose to respond to the question by using a "Short Answer" section 42 having a "YES" box 44 and a "NO" box 46. If the answer to the question is a simple "yes" or "no", the busy person only has to check the appropriate box in the "Short Answer" section 42 indicating one or the other. If the answer requires more than a "yes" or "no", the person being questioned can write the answer in the "Short Answer" section 42 provided on the paper. Just because someone uses the tool 26 to ask a question, it doesn't mean the person being questioned must answer using such tool 26. The "Short Answer" section 42 is provided as a matter of convenience, if and only if the person is able to respond while still being busy. If not, the person asking the question is obligated to wait until the other person is not busy to get an answer.

There are many benefits to using the tool 26 as a specialized sheet of paper. It's the only polite way to communicate with someone who is busy. When communication channels remain open no one is omitted and left to feel less important. Expressing oneself in writing is a good practice. Once the question is written, it is less likely to be forgotten.

The form of the sheet of paper of the tool 26 can vary in sizes ranging from the one described above to 8½×5½ inches printed on both sides. The size of the paper could further be reduced to 4¼×5½ inches. The sheets can be available in note pads, 50 sheets to a pad. Regular tear sheet and sticky note designs, and some pads can be magnetically mounted to the refrigerator. The sheets may be printed on multicolored paper with different color ink.

Figure 4:
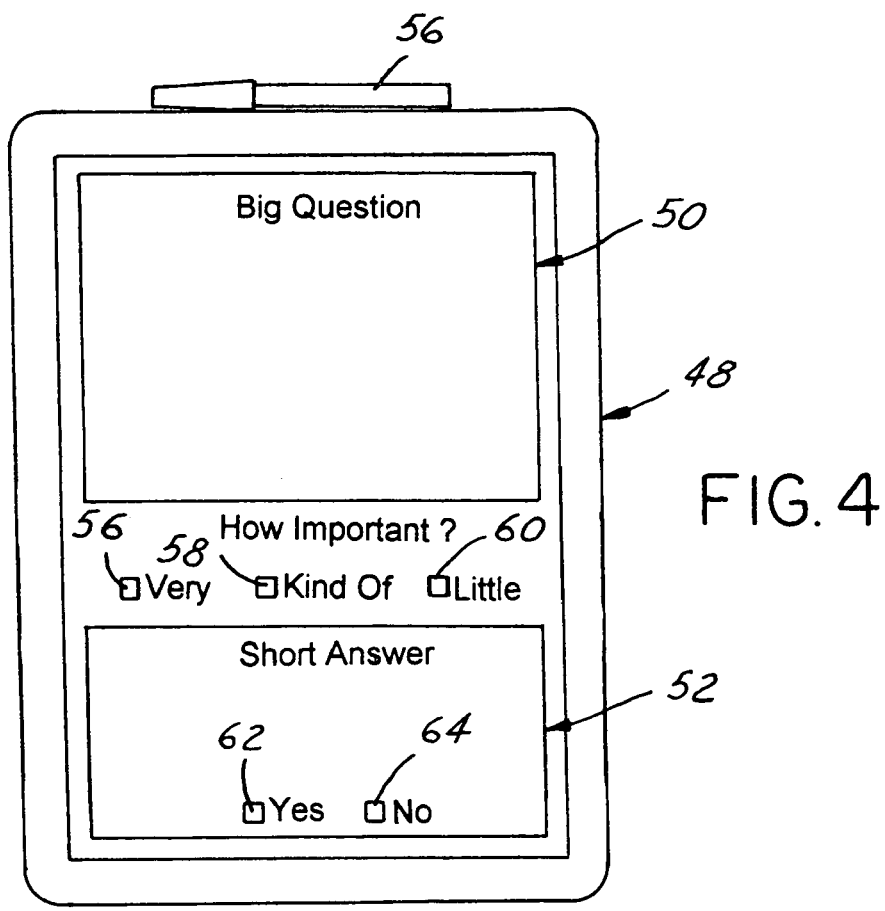
FIG. 4 is a view of a third form of silent communication tool which take the form of an eraser board that can function in a manner similar to the specialized sheet of FIG. 3.

Finally, FIG. 4 discloses a communication tool 48 in the form of a dry erase marker board measuring 8½×111 inches. It resembles the side of the tool 26 in FIG. 3 used to ask a question. It has a "Big Question" section 50, a "Short Answer" section 52, and an area 54 to indicate the importance of the question. The tool 48 includes an erasable magic marker 56 that clips right onto the top portion of the board. It also has magnetic strips (not shown) on the rear of the board that allow the consumer to mount the board to most refrigerators for easy access and storage. Children that have the ability to read and write would use this tool 48 to silently communicate their question with someone who is busy. Like the tool 26, the person who has a question can write it in the "Big Question" section 50 and also indicate how important the question is by checking one of the three boxes 56, 58, and 60 located respectively adjacent the words "VERY", "KIND OF" and "LITTLE". The person receiving the question can respond in the "Short Answer" section 52 by providing a written answer or indicating a simple "yes" by checking a "YES" box 62 or a simply "no" by checking a "NO" box 64. The board can be erased with a tissue or paper towel.

The operation of the invention is as follows: The tool 16 in the form of the plush toy question-mark is the first tool the child will learn to use, especially the younger children. Tell the child that the tool 16 is called a question-mark and show them how they can use it to ask a question without saying a word. Explain to them that when they have a question and you are on the phone or busy with someone else, all they have to do is hang it on your wrist or just hand it to you in silence. Kind of like raising your hand in class when you have a question, and waiting in silence for the teacher to answer. Next, do a couple of pretend scenarios with you being "The Busy One," and your child being "The Silent One.". Tell the child to pretend to have a question or to make one up. "Ring Ring.". You answer the fake phone call. Continue to talk on the phone for a minute or two, making sure the child maintains their silence. Then hang up the phone and immediately ask the child about their question. Children love to pretend and play act. This will seem like a game to them. Once they do it right, dish out the praise. Reward them for mastering their new skill. Tell them they are learning the art of silent communication. At times, they may get impatient. You must explain to them ahead of time that you may be tied up for awhile. They might want to go do something else, and that you will come get them as soon as you are done. Make it clear that they don't have to sit frozen like a statue waiting for you to answer. They're just not allowed to speak to you while you are holding the tool 16. Practice other scenarios to act out. Like talking with your neighbor. First showing them how to do it then letting them do it themselves. Every child learns at their own pace. They might require gentle reminders from time to time. Don't be upset if you have to show them the procedure a second time. It's a totally new concept and it is going to take a little time to get used to it.

As to the second method of silent communication, you will want to teach the child about use of the tool 26. As mentioned above, the tool 26 has a question-mark 30 on one side along with the sign-language-sign 28 for silence. Children are instructed to use the specialized paper just like the plush toy tool 16. They don't even have to write on the other side. The other side has the "Big Question" section 34. That enables the child to draw or write what their question is about and then hand the tool 26 to you. You then have two choices. You can hold onto the tool 26 until you are finished with your telephone call, or wait for a pause in your verbal conversation or create one, and glance at what the child's question is all about. Chances are it's something simple. It might even require just a simple "yes" or "no". You have the right, according to the rules, to keep the written communiqué in the pause mode, but, if you can find a moment in the conversation to respond, there is the "Short Answer" section 42 at the bottom of the form where you can check the "YES" box 44 or the "NO" box 46 or write a short answer. You are in no way obligated to answer any question until you are done concentrating on what you were doing. However, if you are going to be tied up on the phone for a long time, you may not want to keep the child on hold forever. You can use the "Short Answer" section 42 for a pithy reply.

The third tool 48 for silently communication is a dry eraser board. It looks like and functions exactly like the front side of the paper form. It comes with it's own marker 56 and wipes clean with a tissue. It can be magnetically mounted to most refrigerators for easy access.

Work-at-home parents and home-businesses are on the rise. Parents in those situations may find themselves busier and less accessible to their offspring. You may be physically present in the home, but if the child cannot communicate with you, to them it's almost like you're not there at all. They feel cut off. You don't want a rebellion on your hands in the middle of an important business call because your child wants to be at the center of the universe. Try negotiating a power deal on the phone while reasoning with a five-year-old who has question and feels neglected. The silent communicator tools 16, 26, and 48 and the methods explained above, re-establishes communication with the child. The child is happy because he or she is back in the loop. Parents feel good knowing their child knows how to handle those situations.

The tools 16, 26, and 48 and the method of using such tools, like many other good educational tools for children, resembles a game. Remember to approach it like a game and try to keep it fun. Make sure the game pieces are accessible. When they do communicate correctly, reward them with praise. Place a peel-and-stick star, or write one, on the back of the paper every time the child does the behavior correctly. They love positive recognition for their good deeds. They will learn quickly and easily if they feel good about what they are doing.

The rules for grown-ups are simple. Teach the child the rules of engagement. Don't get mad if and when the child forgets to use the system. Nicely remind them. Praise them and reward them for doing it correctly. Always answer their question as soon as you possibly can.

The rules for children are just as simple. They are the silent ones and are as follows: Choose one of three communication tools 16, 26, or 48 and give it to the person that is busy. Do not speak to the busy person until the busy person is not busy any longer. Hand over the tool and maintain silence until the person who was busy summons you. Never throw the stuffed toy question mark tool 16 in anger.

Here are several keys to the success of this methodology. Make sure the tools 16, 26 and 48 readily accessible. You can't play this game if it takes a half an hour to find the tool. Show and tell the child how to use the system. Remind them when necessary. Reward them for doing it right. Repeatedly embrace this method of communication enthusiastically yourself by sending and receiving these silent messages. Follow the instructions, and in a short period of time, you will be communicating silently and effortlessly.

It is the inventors' sincere hope that this method of communication will save millions of American children from countless reprimands and disciplinary actions, and save their parents from a lot of aggravation.

Various changes and modifications can be made in the communication tools and the method set forth above without departing from the spirit of the invention. Such changes and modifications are contemplated by the inventors and they do not wish to be limited except by the scope of the claims.

The embodiments of the invention in which an exclusive property or privilege is claimed are defined as follows:

1. A method for providing silent communication between two persons when one of said persons has a question needing an answer and the other of said persons is busy comprising the steps of
    (a) providing a tool having a configuration of a question mark that visually indicates that a question needs to be answered and wherein said configuration of said tool includes a curved hook portion having an inner dimension of a size conforming to a part of the arm of said other of said persons and also includes a dot of said question mark connected to and suspended from the lower end of said curved hook portion;
    (b) instructing said one of said persons by said other of said persons that said tool should be placed onto the arm of said other of said persons without any verbal communication when said one of said persons has a question that needs to be answered;
    (c) having said one of said persons maintain silence while said one of said persons places said curved hook portion of said tool onto said part of the arm of said other of said persons so as to cause said curved hook portion to substantially encircle said part of the arm and make physical contact therewith whereby said other person is alerted to the fact that a question is being posed that needs an answer, and;
    (d) having said other of said persons react to said physical contact of said tool on said part of said arm and allow the question to then be verbally communicated by said one of said persons to said other of said persons when said other of said persons is no no longer busy.

2. A method for providing silent communication between two persons when one of said persons has a question needing an answer and the other of said persons is busy comprising the steps of
    (a) providing a tool having a configuration of a question mark that visually indicates that a question needs to be answered and wherein said configuration of said tool includes a curved hook portion having an inner dimension of a size conforming to a part of the arm of said other of said persons and also includes means for forming the dot of said question mark connected to and suspended from the lower end of said curved hook portion;
    (b) instructing said one of said persons by said other of said persons that said tool should be placed onto the arm of said other of said persons without any verbal communication when said one of said persons has a question that needs an answer;
    (c) grasping said tool by said one of said persons when said one of said persons has a question;
    (d) placing said tool by said one of said persons onto the arm of said other of said persons so as to cause said curved hook portion to substantially encircle said part of the arm and make physical contact therewith;
    (e) reacting to said physical contact of said tool on said part of said arm by said other of said persons;
    (f) recognition by said other of said persons that said tool is in the form of a question mark indicating that a question is being posed by said one of said persons that needs an answer, and;
    (g) allowing the question to then be verbally communicated by said one of said persons to said other of said persons when said other of said persons is no longer busy.

* * * * *